May 31, 1966     A. K. TVEDTEN     3,253,576

BIRD FEEDER DEVICE

Filed Nov. 13, 1964

INVENTOR.
ALLARD K TVEDTEN
BY
Williamson & Palmatier
ATTORNEYS

United States Patent Office 3,253,576
Patented May 31, 1966

---

3,253,576
BIRD FEEDER DEVICE
Allard K. Tvedten, Crookston, Minn., assignor to Dahlgren & Company, Inc., Crookston, Minn., a corporation of Minnesota
Filed Nov. 13, 1964, Ser. No. 411,002
5 Claims. (Cl. 119—51)

This invention relates to a bird feeder device.

An object of this invention is to provide a novel bird feeder device, of simple and inexpensive construction, which may be readily assembled and disassembled, and which when assembled may be quickly and easily mounted on a support such as a post, tree, window sill or the like.

A more specific object of this invention is to provide a novel and improved bird feeder device including a tray structure having a centrally located open top receptacle therein especially adaptable to contain suet cakes and the like for consumption by birds, and a detachable bracket member having engagement elements thereon for releasably but frictionally engaging socket elements on the tray structure permitting the tray structure to be easily but firmly attached to a point spaced above the surface of the ground.

A further object of this invention is to provide a bird feeder device of the class described wherein the tray structure is preferably formed through molding from plastic material and thereby permitting such features as reinforcing ribs, drain channels, peripheral flanges and socket elements to be molded in the tray structure during the formation thereof.

These and other objects and advantages of this invention will more fully appear from the following description made in connection with the accompanying drawings, wherein like reference characters refer to the same or similar parts throughout the several views, and in which.

Figure 1:
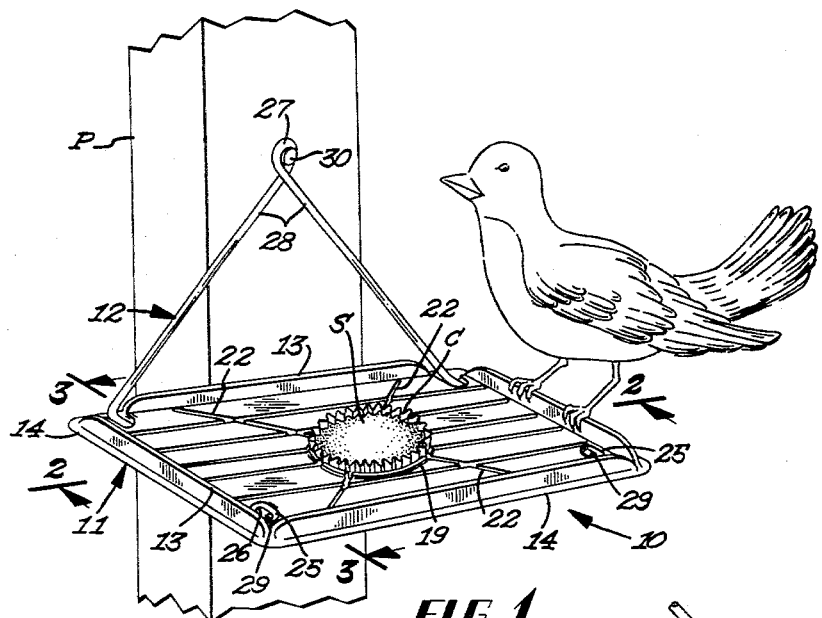
FIG. 1 is a perspective view of the bird feeder device constituting the present invention.

Referring now to the drawings, it will be seen that one embodiment of the bird feeder device, designated generally by the reference numeral 10 is there shown. This bird feeder device 10 includes a tray structure 11 and an attachment member or bracket 12. The tray structure 11 is preferably formed through a molding operation of an impervious plastic material although other suitable rigid materials may also be used. It will be noted that this tray structure 11 is of elongate generally rectangular configuration. The marginal edge portions of the tray structure 11 are integrally formed with inverted U-shaped elements 13 which define upwardly projecting pairs of opposed transverse and longitudinal flanges. It will be noted that the lower outer portion 14 of the flanges 13 projects downwardly beyond the major portion of the tray structure and then projects outwardly therefrom. This lower outer portion 14 of each flange 13 is integrally formed and continuous with the lower outer portion of the other flanges so that a continuous outturned lip is formed. It will be noted, however, that the flanges 13 are not continuous with each other and terminate closely adjacent but spaced from the next adjacent flange.

The tray structure 11 also has molded therein a plurality of longitudinally extending substantially parallel downwardly projecting reinforcing ribs 15 which together with the U-shaped flanges 13 impart rigidity and strength to the tray structure. To this end, it will be noted that the tray structure 11 has a relatively small thickness dimension but the unique molded ribs and U-shaped flanges provide the necessary strength for the tray structure.

Figure 2:
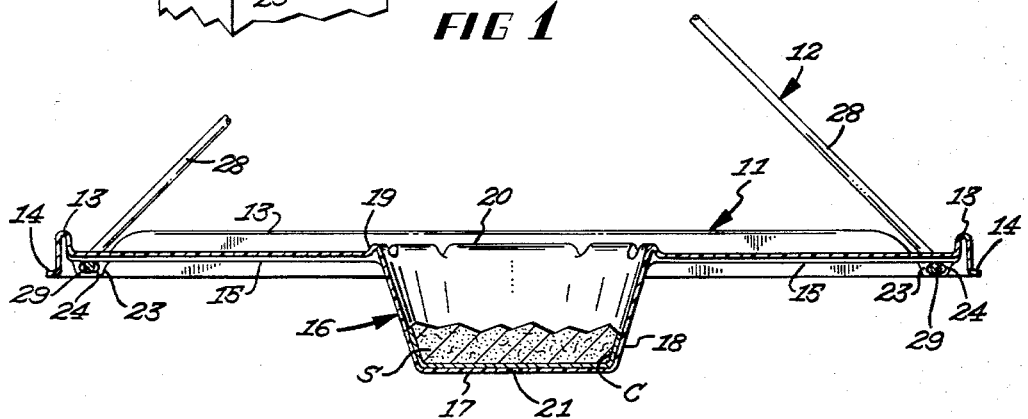
FIG. 2 is a cross-sectional view on an enlarged scale taken approximately along the line 2—2 of FIG. 1 and looking in the direction of the arrows.
Figure 3:
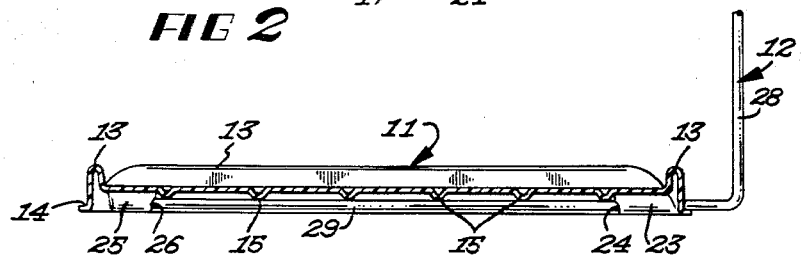
FIG. 3 is a cross sectional view on the same scale as FIG. 2 taken approximately along the line 3—3 of FIG. 1 and looking in the direction of the arrows.

The tray structure 11 is also provided with a centrally located open top receptacle 16 which as seen is comprised of a substantially flat bottom wall 17 to which is secured an upstanding continuous closed frusto-conically shaped peripheral wall 18. It will be noted that the upper peripheral edge of the peripheral wall 18 projects upwardly beyond the general plane of the tray structure 11, as best seen in FIG. 2, and is provided with an outturned and downwardly projecting marginal portion 19 which is integrally formed with the tray portion 11. Thus, it will be seen that since the peripheral wall 18 projects upwardly beyond the tray structure 11, the marginal portion 19 thereof defines a lip 20 between the interior of the receptacle 16 and the tray structure 11.

Referring again to FIG. 2 it will be seen that the bottom wall 17 of the receptacle 16 is provided with a centrally located drain opening or aperture 21 which is operative to permit water which may accummulate within the receptacle to be discharged therefrom. The tray structure 11 is provided with transversely diagonally extending drain channels 22, each of which has its innermost end extending through the lip 20 so that these channels communicate with the interior of the receptacle 16. These drain channels permit water to be drained from the tray structure into the receptacle and thereafter through the discharge aperture 21. It will also be noted that the channels defined by the reinforcing ribs 15 also extend through the lip 20 and communicate with the interior of the receptacle 16.

Means are also provided for attaching or mounting the tray structure 11 from a support such as a post, tree or window sill or the like and to this end, it will be seen that the tray structure 11 is provided with a pair of laterally spaced-apart generally channel-shaped rear socket elements 23, each having an aperture 24 therethrough. The tray structure 11 is also provided with a pair of laterally spaced apart generally channel-shaped front socket elements 25, each provided with an aperture 26 therein. Each of the rear socket elements is disposed in substantial alignment with one of the front socket elements so that the respective apertures therein are also disposed in aligned or registering relation. It will be noted that each aligned pair of front and rear socket elements is disposed adjacent one of the transverse flanges 13 as best seen in FIG. 2.

In the embodiment shown, the bracket 12 is preferably formed from a single piece of metallic stock such as wire or the like, which is bent to form a central loop 27 having diverging legs 28 extending downwardly and outwardly therefrom. The terminal portions of the legs 28 are bent at substantially right angles thereto and each defines a socket engaging element 29 which has a longitudinal dimension only slightly less than the transverse or fore and aft dimension of the tray structure. It will be noted that the socket engaging elements 29 are disposed in substantially parallel relation to each other and are adapted to be inserted through the aligned apertures of a pair of front and rear socket elements of the tray structure. It is preferred that the lateral spacing between the socket engaging elements 29 be slightly greater or slightly less than the spacing between one transversely aligned pair of socket elements and the other transversely aligned pair of socket elements. This spacing referred to is in the direction and the longitudinal dimension of the tray structure 11 and would also correspond to the spacing between the rear socket elements or the spacing between the front socket elements. With this particular arrangement, the socket engaging elements 29 will either have to be moved inwardly toward each other or outwardly away from each other for insertion into the socket elements. Thus, because of the resiliency of the bracket 12, the socket engaging elements will engage the socket elements with a frictional effect to very effectively support the tray structure.

Since the bracket 12 may be easily attached or removed from the tray structure 11, the bird feeder device may be very quickly assembled and disassembled as desired. When used, the bird feeder device is preferably mounted above the ground on a supporting structure such as a tree, post, window sill or the like. Referring now to FIG. 1, it will be seen that in mounting the bird feeder device, any suitable securing element 30 such as a nail, bolt or the like may be suitably attached to a supporting structure such as a post P so that the securing element passes through the loop 27 and effectively secures the bracket member to the support to orient the tray structure 11 in a substantially horizontal position. The receptacle 16 is adapted to contain the suet cake S preferably formed of animal fat and both coarse and fine sunflower seed particles. The suet cake is shaped to fit nicely within the receptacle and may be contained within a suitable paper cup C. It will be noted that the flanges 13 not only reinforce the peripheral portions of the tray structure but also serve as perches for birds which are so located relative to the receptacle 16 that the birds can conveniently eat and consume the suet cake. The entire bird feeder device including the tray structure, bracket 12 and a plurality of suet cakes may be very conveniently incorporated in a small package for ease in handling.

It will also be noted that the bird feeder device may be readily assembled by a user and mounted on a supporting structure with a minimum effort and without requiring any special tools or the like.

Thus, it will be seen that not only is the bird feeder device of simple and inexpensive construction, but one that functions in a more efficient manner than any heretofore known comparable device.

It will, of course, be understood that various changes may be made in the form, details, arrangement and proportions of the various parts without departing from the scope of my invention.

What is claimed is:

1. A bird feeder device comprising
   a substantially flat tray structure having inverted U-shaped elements integrally formed with the edges thereof and projecting upwardly therefrom to define upstanding peripheral flanges, said tray structure having a plurality of spaced-apart socket elements integrally formed therewith and each having a recess therein,
   a generally frusto-conically shaped open top receptacle having a bottom wall and a substantially vertically disposed peripheral wall integral therewith and projecting upwardly therefrom, said peripheral wall having an upper edge integrally formed with said tray structure centrally thereof, said bottom wall having a drain opening therein,
   said tray structure having a plurality of elongate drain channels therein each communicating at one end with said receptacle,
   a bracket formed from an elongate single piece of metallic material bent to define a central loop and a pair of diverging legs extending therefrom, said legs having their respective terminal portions bent and disposed in substantially parallel relation to define socket engaging elements releasably engaging said socket elements whereby when said loop is attached to a support such as a post or the like, said tray structure will be supported in a substantially horizontal position.

2. A bird feeder device comprising
   a substantially rectangularly shaped flat tray structure having inverted U-shaped elements integrally formed with the edges thereof and projecting upwardly therefrom to define opposed upstanding front and rear flanges and opposed side flanges, said tray structure having a pair of laterally spaced apart socket elements integrally formed therewith and each having a recess therein,
   an open top receptacle having a bottom wall and a substantially vertically disposed peripheral wall integral therewith and projecting upwardly therefrom, said peripheral wall having its upper edge integral with said tray structure and located centrally thereof, said bottom wall having a drain opening therein,
   said tray structure having a plurality of diagonally extending elongate drain channels therein, each communicating at one end with said receptacle,
   a bracket formed from an elongate single piece of metallic material bent to define a central loop and a pair of diverging legs extending therefrom, said legs having their respective terminal portions bent and disposed in substantially parallel relation to define elongate socket engaging elements releasably engaging said socket elements, said socket engaging elements each being of a length only slightly less than the fore and aft dimension of said tray structure whereby when said loop is attached to a support such as a post or the like, said tray structure will be supported in a substantially horizontal position.

3. The bird feeder device as defined in claim 1 wherein said socket elements depend from said tray structure and wherein a substantial portion of said socket engaging elements underlie said tray structure.

4. A bird feeder device comprising
   a substantially flat generally rectangular shaped tray structure having inverted U-shaped elements integrally formed with the edges thereof and projecting upwardly therefrom to define upstanding peripheral flanges, said tray structure having a plurality of longitudinally extending elongate downwardly projecting rib elements formed therein and cooperating with said peripheral flanges to impart rigidity to said tray structure,
   said tray structure having a plurality of downwardly projecting channel-shaped socket elements integrally formed therewith and each having a recess therein, said socket elements being arranged in aligned pairs,
   a generally frusto-conically shaped open top receptacle having a bottom wall and a substantially vertically disposed peripheral wall integral therewith and projecting upwardly therefrom, said peripheral wall having an upper edge integral with said tray structure and being located centrally thereof, said bottom wall having a drain opening therein,
   said tray structure having a plurality of elongate drain channels therein each communicating at one end with said receptacle,
   a bracket including a central annular element having a pair of elongate elements extending therefrom and frictionally engaging said sockets on said tray structure whereby when said loop is attached to a support such as a post or the like, said tray structure will be supported in a substantially horizontal position.

5. A bird feeder device comprising
   a substantially flat tray structure having inverted U-shaped elements integrally formed with the edges thereof projecting upwardly therefrom to define upstanding arcuately curved perches, said tray structure having a plurality of spaced apart socket elements integrally formed therewith and each having a recess therein, an open top receptacle having a bottom wall and a substantially vertically disposed continuous closed peripheral wall integral therewith and projecting upwardly therefrom, said peripheral wall having an upper edge integrally formed with said tray structure and being located centrally thereof, a bracket shaped to deform a centrally located loop having a pair of legs extending therefrom, said legs having their respective terminal portions insertable into said socket elements with snap-coupling effect whereby said bracket may be releasably secured to said tray structure, said loop being adapted to receive an attachment element therethrough and cooperating with such an attachment element for securing the bracket to a support such as a post or the like whereby said tray structure will be supported in a substantially horizontal position.

References Cited by the Examiner

UNITED STATES PATENTS

| | | | |
|---|---|---|---|
| 1,749,497 | 3/1930 | McGlashan | 119—61 |
| 2,316,463 | 4/1943 | Skulina | 119—51 |

SAMUEL KOREN, *Primary Examiner.*

HUGH R. CHAMBLEE, *Examiner.*